Dec. 6, 1927.
L. B. FISH
1,651,451
BATTERY LIGHT
Filed July 9, 1924
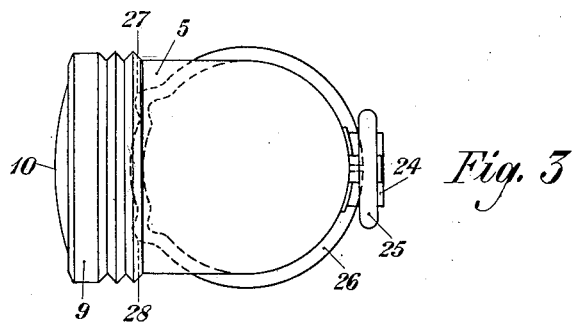
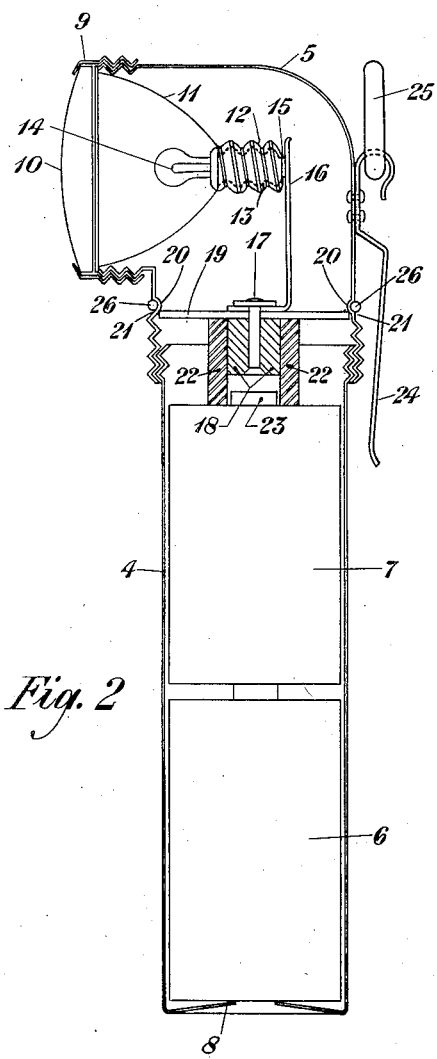
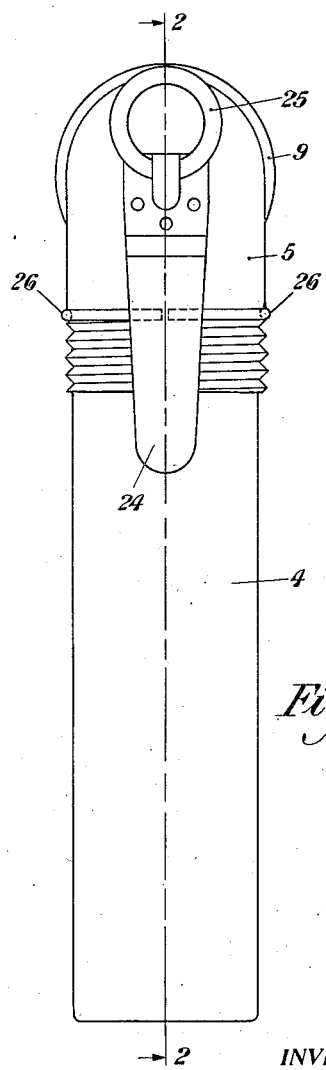
INVENTOR
L.B.Fish
BY
ATTORNEY Patented Dec. 6, 1927.

1,651,451

UNITED STATES PATENT OFFICE.

LEWIN B. FISH, OF MAPLEWOOD, NEW JERSEY, ASSIGNOR TO AMERICAN TELEPHONE AND TELEGRAPH COMPANY, A CORPORATION OF NEW YORK.

BATTERY LIGHT.

Application filed July 9, 1924. Serial No. 725,061.

This invention relates to battery lights, and more particularly to battery lights having the lamp directed in a line at right angles to the longitudinal axis of the battery case.

It is often desirable or convenient, especially in the course of commercial use, to place such a battery light with the battery case in horizontal position on the edge of a shelf or other support and with the lens pointing downward. The object of this invention is to provide suitable means for preventing the rolling of the light when it is so placed and for readily shifting the direction of the lamp and retaining the lamp in the desired position when the battery case is horizontal.

Applicant's invention consists in providing a slip ring siutably placed and carrying a plurality of projections, as will be more fully disclosed below.

Applicant's improvement is applicable to any battery light having the lamp directed in a line at right angles to the longitudinal axis of the battery case. The following detailed description covering one form of such light, with the improvement applied, points out clearly the function of the slip ring with its projections and shows the same in one desirable position on the light.

With reference to the accompanying drawing, Figure 1 shows in rear elevation a battery light of the class designated above, the battery case being vertical, with the slip ring in suitable position thereon. Fig. 2 shows a longitudinal section view taken on the line 2—2 of Fig. 1 in the direction indicated by the arrows; and Fig. 3 shows a top view of the light in the same position, with the slip ring and its projections, a portion of the ring and the projections, actually concealed in such view, being in dotted line. Like numerals of reference in the several figures of the drawing designate corresponding parts of the device.

With reference to the details of the drawing, the body of the light comprises the battery case 4 and the head 5. The upper portion of the battery case is externally screw-threaded, and the lower portion of the head member is internally screw-threaded. The battery case contains the battery cells 6 and 7. The bottom 8 of the battery case is provided with a "poke hole" for the purpose of facilitating the removal of the battery cells.

The head 5 is formed from a single piece of metal and is externally screw-threaded at its outer end. An internally threaded rim 9 is screwed over this outer end of the head and carries the lens 10. The reflector 11 carries an open-ended socket 12, which is internally threaded. The base member 13 of the lamp proper 14 is externally threaded, screwing into the open-ended socket 12, and terminates in a contact member 15. When the lamp is screwed into place, the member 15 makes contact with the spring 16. A rivet 17 fixes the spring 16 to the conducting member 18, passing through the fibre disc 19. This disc is held in place by a corrugation of the head member, this corrugation producing an internal support 20 and an external groove 21. A rubber bushing 22 fits against the fibre disc and surrounds the member 18, fitting closely over and extending to a point slightly below the lower end of that member. The contact portion 23 of the upper battery cell 7 is normally held away from the member 18 by the rubber bushing 22. When the lamp is to be lighted, the battery case 4 is turned into the head 5. This operation compresses the rubber bushing 22 and forces the upper cell to make contact. The circuit is as follows: Cell 7 (contact portion 23), member 18 and rivet 17, spring 16, end contact portion 15 of the lamp base member, filament of the lamp, 14, outer portion of the lamp base member 13, open-ended socket 12, reflector 11, head casing 5, battery casing 4, and the lower battery cell 6. The reverse operation of unscrewing the battery case breaks this circuit.

The clip 24 riveted to the back of the head 5 and the umbrella ring 25 attached to the clip facilitate the fixing or hanging of the light in the most suitable position for illuminating the place of work.

In the groove 21, referred to above, on the outside of the lower portion of the head 5, applicant places a slip ring 26 with projections 27 and 28. This feature prevents the rolling of the light when the same is placed on the edge of a shelf or other support with the battery case in horizontal position and the lens pointing downward. Furthermore, it permits the operator to turn the beam of light from the lamp in any desired direction with the minimum of effort and inconvenience, the projections 27 and 28 retaining the slip ring in its position while the body of the light rotates about its longitudinal axis.

It will be readily understood that certain changes from the above specification with reference to the form of the slip ring and its projections and with reference to the position of the same may be made within the limits defined by the appended claims.

What is claimed is:

1. A battery light including a head member having in its exterior surface a circumferential groove, a cylindrical battery case adapted to screw into said head member, a battery in said battery case, a lamp carried in said head member and directed in a line substantially at right angles to the longitudinal axis of said battery case, means for effecting the closing of a circuit through said lamp and said battery upon the screwing of the battery case into the head member, and means movable in said circumferential groove for supporting the battery light so as to prevent displacement of said axis when the body of the battery light is rotated thereabout.

2. A battery light including a head member having in its exterior surface a circumferential groove, a cylindrical battery case adapted to screw into said head member, a battery in said battery case, a lamp carried in said head member and directed in a line substantially at right angles to the longitudinal axis of said battery case, means for effecting the closing of a circuit through said lamp and said battery upon the screwing of the battery case into the head member, and a ring movable in said circumferential groove and having a plurality of abbreviated outward projections, whereby, when the battery light is laid on a flat surface, the axis of the battery case may be held fixed while the body of the battery light is rotated thereabout.

3. A battery light, including a cylindrical battery case threaded at one end; an elbow-shaped head member having its base portion threaded to receive said battery case and having a circumferential groove in the exterior surface of said portion, said groove being perpendicular to the longitudinal axis of the battery case; a battery in said battery case; a lamp mounted in the upper portion of said head member and directed in a line substantially perpendicular to the longitudinal axis of the battery case; means for effecting the closing of a circuit through said lamp and said battery upon the screwing of the battery case into the head member; and a ring circumferentially movable in said groove and having a plurality of abbreviated outward projections such that, when the battery case is horizontally placed on a flat surface and the lamp is projected over the edge thereof, the direction of the lamp may be varied while the longitudinal axis of the battery case remains fixed.

4. A battery light, including a cylindrical battery case threaded at one end; an elbow-shaped head member having its base portion threaded to receive said battery case and having a circumferential groove in the exterior surface of said portion, said groove being perpendicular to the longitudinal axis of the battery case; a battery in said battery case; a lamp mounted in the upper portion of said head member and directed in a line substantially perpendicular to the longitudinal axis of the battery case; means for effecting the closing of a circuit through said lamp and said battery upon the screwing of the battery case into the head member; and a ring circumferentially movable in said groove and having a plurality of corrugations such that, when the battery case is horizontally placed on a flat surface and the lamp is projected over the edge thereof, the direction of the lamp may be varied while the longitudinal axis of the battery case remains fixed.

5. A battery light, including a cylindrical battery case threaded at one end; an elbow-shaped head member having its base portion threaded to receive said battery case and having a circumferential groove in the exterior surface of said portion, said groove being perpendicular to the longitudinal axis of the battery case; a battery in said battery case; a lamp mounted in the upper portion of said head member and directed in a line substantially perpendicular to the longitudinal axis of the battery case; means for effecting the closing of a circuit through said lamp and said battery upon the screwing of the battery case into the head member; and a ring circumferentially movable in said groove and having a plurality of abbreviated outward projections such that, when the battery case is horizontally placed on a flat surface and the lamp is projected over the edge thereof, the body of the battery light may be rotated about the longitudinal axis of the battery case while said axis remains fixed.

6. A battery light, including a cylindrical battery case threaded at one end; an elbow-shaped head member having its base portion threaded to receive said battery case and having a circumferential groove in the exterior surface of said portion, said groove being perpendicular to the longitudinal axis of the battery case; a battery in said battery case; a lamp mounted in the upper portion of said head member and directed in a line substantially perpendicular to the longitudinal axis of the battery case; means for effecting the closing of a circuit through said lamp and said battery upon the screwing of the battery case into the head member; and a ring circumferentially movable in said groove and having a plurality of corrugations such that, when the battery case is horizontally placed on a flat surface and the lamp is projected over the edge thereof, the body of the battery light may be fully rotated about the longitudinal axis of the battery case while said axis remains fixed.

In testimony whereof, I have signed my name to this specification this 8th day of July 1924.

LEWIN B. FISH.